(12) United States Patent
Benton

(10) Patent No.: US 8,360,507 B2
(45) Date of Patent: Jan. 29, 2013

(54) APPARATUS FOR REDUCING DRAG ON A VEHICLE

(76) Inventor: Craig R. Benton, Phoenix, AZ (US)

( * ) Notice: Subject to any disclaimer, the term of this patent is extended or adjusted under 35 U.S.C. 154(b) by 0 days.

(21) Appl. No.: 12/969,456

(22) Filed: Dec. 15, 2010

(65) Prior Publication Data

US 2011/0148140 A1   Jun. 23, 2011

Related U.S. Application Data

(63) Continuation-in-part of application No. 11/653,536, filed on Jan. 16, 2007, now Pat. No. 7,862,102.

(60) Provisional application No. 61/374,418, filed on Aug. 17, 2010.

(51) Int. Cl.
*B60J 9/04* (2006.01)

(52) U.S. Cl. .................................. 296/180.1

(58) Field of Classification Search .... 296/180.1–180.5, 296/181.5; 180/903
See application file for complete search history.

(56) References Cited

U.S. PATENT DOCUMENTS

| | | | |
|---|---|---|---|
| 1,714,609 A | 5/1929 | Massey | |
| 1,913,169 A | 6/1933 | Martin | |
| 2,938,680 A | 5/1960 | Greene et al. | |
| 3,178,131 A | 4/1965 | Laing | |
| 3,455,594 A | 7/1969 | Hall et al. | |
| 3,791,468 A | 2/1974 | Bryan, Jr. | |
| 3,794,372 A * | 2/1974 | Webb | 296/180.3 |
| 3,834,752 A * | 9/1974 | Cook et al. | 180/309 |
| 3,951,445 A | 4/1976 | Tatom | |
| 3,960,402 A | 6/1976 | Keck | |
| 3,999,797 A | 12/1976 | Kirsch et al. | |
| 4,290,639 A * | 9/1981 | Herpel | 296/180.3 |
| 4,320,920 A | 3/1982 | Goudey | |
| 4,379,582 A | 4/1983 | Miwa | |
| 4,458,937 A | 7/1984 | Beckmann et al. | |
| 4,462,628 A | 7/1984 | Gregg | |
| 4,810,022 A | 3/1989 | Takagi et al. | |
| 4,976,349 A | 12/1990 | Adkins | |
| 5,199,762 A | 4/1993 | Scheele et al. | |
| 5,280,990 A | 1/1994 | Rinard | |
| 6,045,095 A | 4/2000 | Parrish, IV | |
| 6,846,035 B2 * | 1/2005 | Wong et al. | 296/180.1 |
| 6,886,882 B2 * | 5/2005 | Farlow et al. | 296/180.4 |
| 7,192,077 B1 | 3/2007 | Hilleman | |
| 7,484,791 B1 | 2/2009 | Chen | |
| 7,862,102 B1 * | 1/2011 | Benton | 296/180.1 |
| 2004/0256885 A1 | 12/2004 | Bui | |
| 2007/0228772 A1 | 10/2007 | Froeschle et al. | |

FOREIGN PATENT DOCUMENTS

WO     WO 92/19485     11/1992

* cited by examiner

*Primary Examiner* — Hilary Gutman
(74) *Attorney, Agent, or Firm* — Arent Fox LLP

(57) ABSTRACT

An apparatus for reducing drag on a moving vehicle includes various combinations of a movable segments and a swing arm. Each combination is adapted to be mounted to the rear of the vehicle with a fixed portion being positioned forward of the movable segment upon extraction. The movable segments have a retracted position and an extended position and may be biased to the retracted position. The movable segments deploy to the extended position when moving above a predetermined velocity and returns to a retracted position when moving below the predetermined velocity.

22 Claims, 9 Drawing Sheets

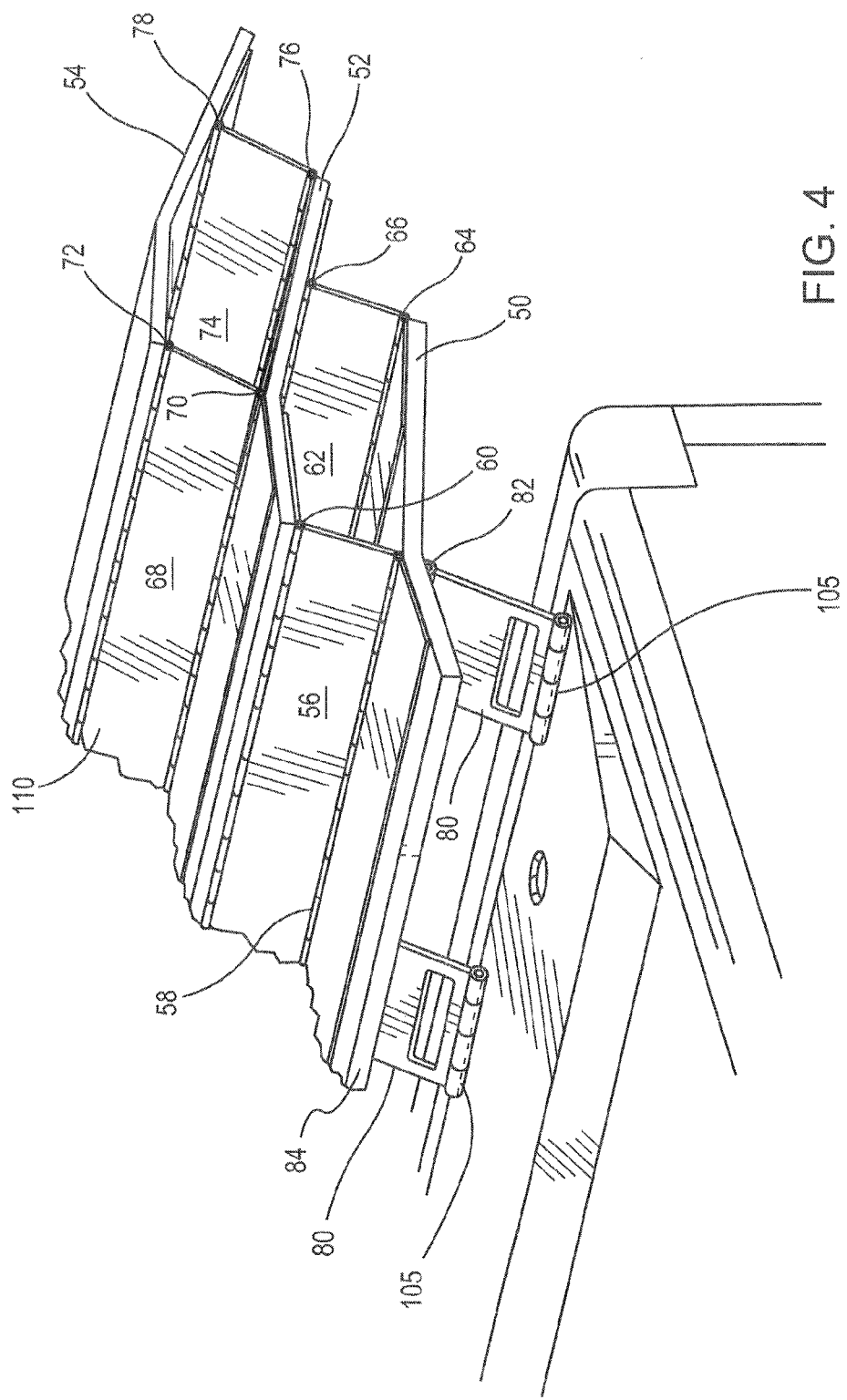

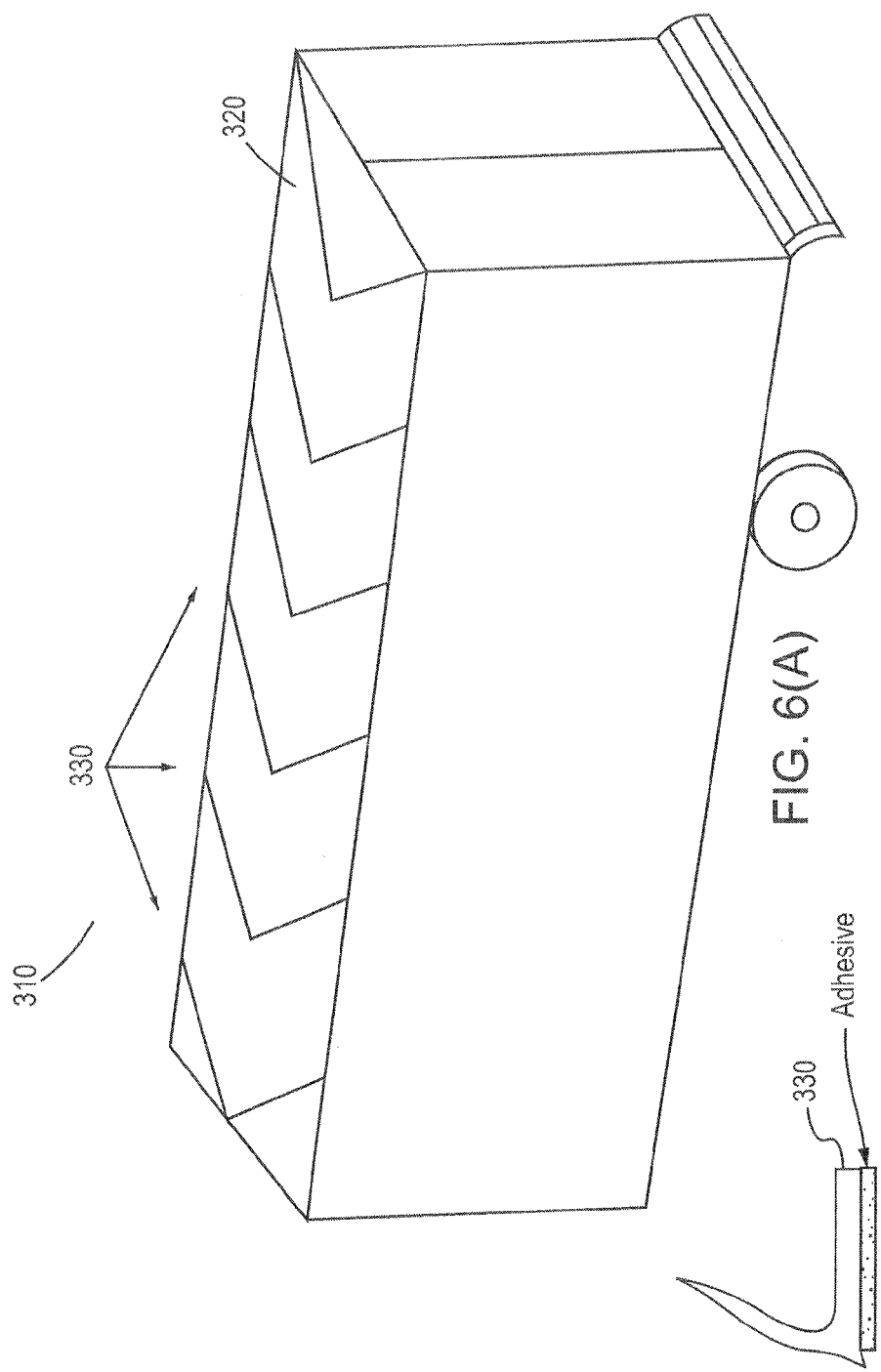

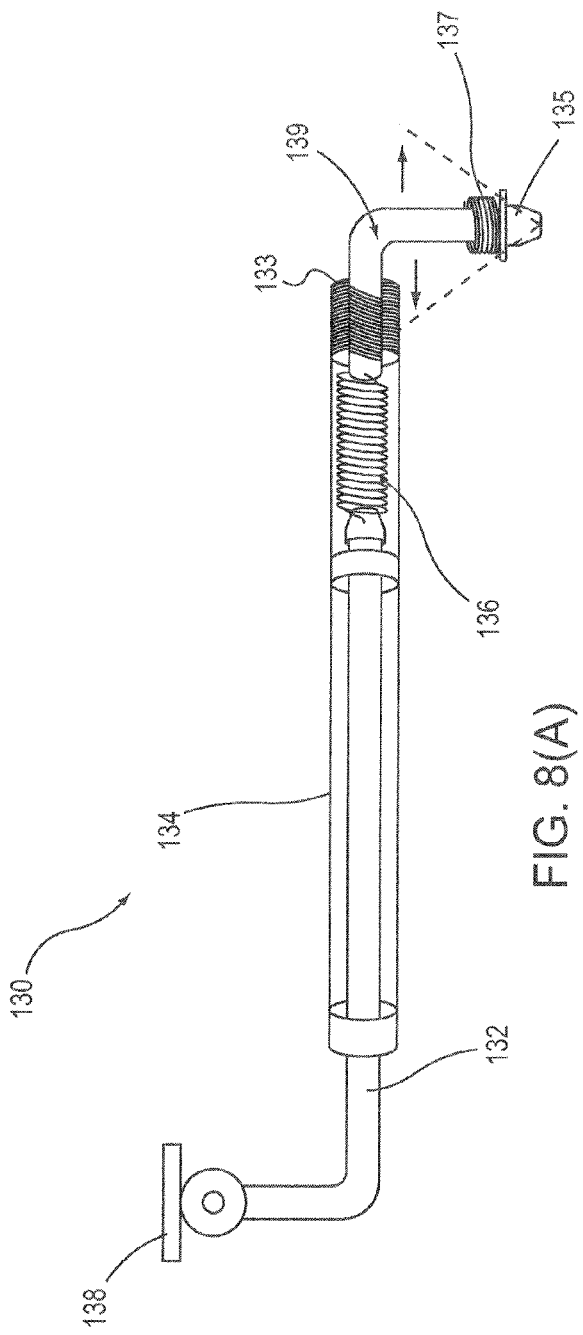
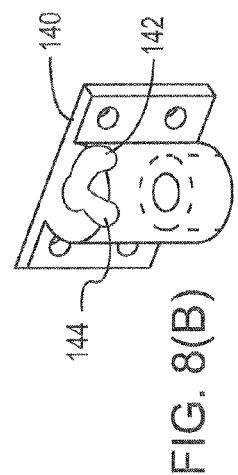
FIG. 8(A)
FIG. 8(B)

APPARATUS FOR REDUCING DRAG ON A VEHICLE

This application is a continuation-in-part application of U.S. patent application Ser. No. 11/653,536, filed Jan. 16, 2007, and titled "Apparatus for Reducing Drag on Vehicles," and claims priority from U.S. Provisional Patent Application No. 61/374,418, filed Aug. 17, 2010, and titled "Apparatus for Reducing Drag on a Vehicle." The disclosures of the above-recited prior applications are each hereby incorporated by reference in their entirety.

BACKGROUND OF THE INVENTION

1. Field of Invention

Aspects of this invention relate generally to the field of atmospheric drag reduction, and more particularly to an apparatus for reducing drag on vehicles.

2. Background of the Invention

When a vehicle is in motion, a low pressure area generally forms at the rear of the vehicle, and the low pressure area may result in increased drag. The increased drag can increase resistance to the motion of the vehicle and force the engine of the vehicle to work harder, and as a result reduce mileage, among other things. The increased drag is often aggravated by the shape of the vehicle. For example, the square-shaped rear end of a semi-tractor trailer may cause far more drag than the round-shaped end of a sports car.

There have been a number of drag reducing devices described in the related art. For example, U.S. Pat. No. 5,280,990 to Rinard ("Vehicle Drag Reduction System," issued on Jan. 25, 1994) describes fixed-position mounted vanes to direct air to the rear of a semi-tractor trailer. Similar devices are found in U.S. Pat. No. 3,999,797 to Kirsch et al. ("Airvane Device for Bluff Vehicles and the Like," issued on Dec. 28, 1976) and U.S. Pat. No. 3,960,402 to Keck ("Vehicle Flow Direction Vanes," issued on Jun. 1, 1976).

U.S. Patent Application Publication No. US2004/0256885 to Bui ("Rear Spoiler With Motorized Vertical and Angle Adjustability," published on Dec. 23, 2004), which provides an adjustable rear spoiler that comprises a wing-like mechanism for trucks, has an electric motor actuator for transmitting rotational motion to a worm gear box assembly, and has a wing unit and wing mounting brackets attached to upper linkage supports to create pivotal angle adjustments.

U.S. Pat. No. 6,045,095 to Parrish, IV ("Vane-Airfoil Combination," issued on Apr. 4, 2000) shows a vane-airfoil combination that comprises a rotating set of vanes located in front of the leading edge of the airfoil assembly. WIPO Application No. W092/19485 to Eliahou ("Vehicle Streamlining Device for Pressure Drag Reduction," published on Nov. 12, 1992) discloses a device for diverting air at the rear of a trailer that comprises a flap for streamlining a vehicle to reduce drag. The flap is raised or lowered by an actuator connected to the vehicle speedometer. U.S. Pat. No. 1,714,609 to Massey ("Airplane," issued on May 25, 1928) shows a dual airfoil for vehicles that comprises a pair of airfoils that provide lift and have forward and rear positions. U.S. Pat. No. 1,913,169 to Martin ("Wing and Like Member for Aircraft," issued on Jun. 6, 1933) provides a combination triple airfoil for vehicles that comprises three airfoils that provide lift and reduce drag and have staggered positions relative to one another.

U.S. Pat. No. 4,810,022 to Takagi et al. ("Automotive Vehicle With Adjustable Aerodynamic Accessory and Control Therefor," issued on Mar. 7, 1989) discloses an adjustable aerodynamic spoiler with a controller that has spoiler settings regulated automatically by sensed driving conditions, such as vehicle speed, crosswinds and the like.

SUMMARY

There remains an unmet need to more effectively reduce the drag caused by the low pressure area that is created behind a moving vehicle. Aspects of the present invention provide an apparatus for reducing drag on vehicles via features that may be wind-actuated or otherwise mechanically actuated. Another variation in accordance with aspects of the current invention may include a foil disposed in a retracted position that may deploy in an expanded position during motion of the vehicle on which the foil is disposed. According to various exemplary aspects, the foil may be activated by a swing arm, and the foil may deploy in several segments from a retracted position to a fully expanded position.

Other aspects and advantages will become apparent in the following description and the features of novelty which illustrate exemplary aspects of this invention will be pointed out with particularity.

BRIEF DESCRIPTION OF THE DRAWINGS

Various exemplary aspects of the systems and methods in accordance with aspects of this invention will be described in detail, with reference to the following figures, wherein:

FIG. 4 is a perspective view of a drag reducing apparatus during deployment between a retracted position and an expanded position, according to various aspects of the current invention;

FIGS. 6A-6B is a perspective view of another exemplary drag reducing apparatus, according to various aspects of the present invention;

FIGS. 8(A)-(B) show views of an exemplary swing arm used in a drag reducing apparatus, according to various aspects of the present invention.

DETAILED DESCRIPTION

These and other features and advantages in accordance with aspects of this invention are described in, or will be apparent from, the following detailed description of various exemplary implementations.

Figure 1A:
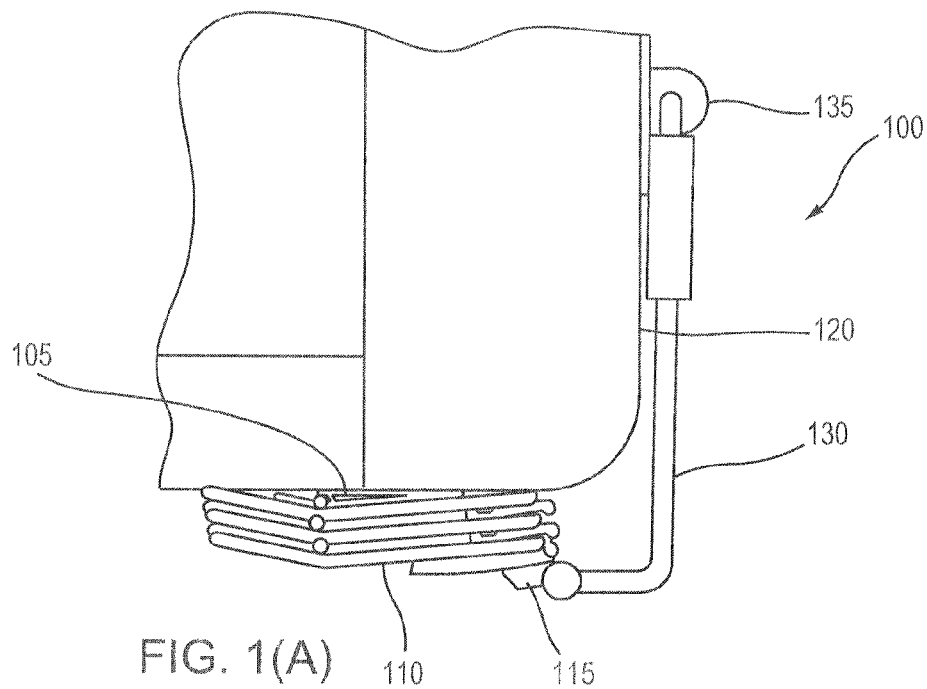
FIGS. 1(A)-(B) are perspective views of an apparatus for drag reduction in a retracted position and an expanded position, according to various aspects of the present invention.
Figure 1B:
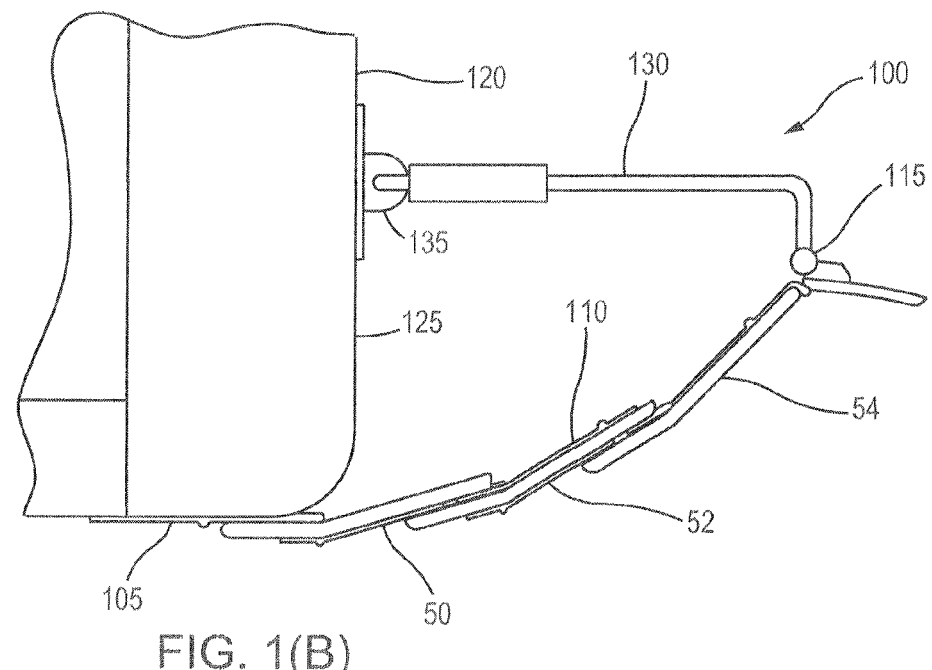

FIGS. 1(A)-(B) are perspective views of an apparatus for drag reduction 100, according to various aspects of the present invention, shown in a retracted position and an expanded position, respectively. In FIG. 1(A), a sectioned thin profile wind diverting material 110 (each wind diverting material also interchangeably referred to herein as a "foil") is held in a retracted position. According to various aspects, the sectioned foil 110 is held in the retracted position under the pressure of one or more biasing features, such as springs (see, e.g., FIG. 8(A)), or torsion pins (see, e.g., FIG. 9) that bias diverters towards a retracted position. A portion 105 of the sectioned foil 110 may be fixed to a portion of a vehicle 120, such as a side or a rear portion, in order to fix the foil 110 to the vehicle 120. It should be noted that the sectioned foil 110 may be held in the retracted position because the vehicle 120 is either not moving or moving below a predetermined speed, with or without biasing. A more detailed description of an exemplary structure of the segmented foil 110 is given below with reference to FIG. 4.

According to various aspects, another portion 115 of the sectioned foil 110, opposite the portion 105, may be proximally joined to a portion of the vehicle 120, such as the back portion 125, via a swing arm 130. The swing arm 130 may be connected to the back portion 125 at a swing arm attachment portion 135, which may also operate as a stop, for example, in order to fix the swing arm 130 to the vehicle 120. An exemplary swing arm 130 will be described in greater detail below with reference to FIGS. 8(A)-(B).

In FIG. 1(B), the foil 110 is shown as fully expanded, and the segments 50, 52 and 54 are deployed, as a result of the expansion of the foil 110. It should be noted that although three segments are represented in FIGS. 1(A)-(B), other variations of the current invention may include more or less segments. When fully expanded, the foil 110 is kept in an advantageous drag reducing position via the swing arm 130. In FIG. 1(B), the advantageous drag reducing position is a position somewhat angled or curved in an inward curve relative to perpendicular to the surface of the back portion 125 of the vehicle 120, so as to follow generally the fluid flow of air past the rear of the vehicle. However, according to various aspects of the current invention, other advantageous drag reducing positions may be determined. The attachment portion 135 of the swing arm 130 may serve as the attachment point of the swing arm 130 to the back portion 125 of the vehicle 120, and may also serve as a stop to prevent the swing arm 130 from over-rotating relative to the side of the vehicle 120 to which the portion 105 is attached. According to various aspects, the portion 135 may also comprise a biasing element, such as a spring or a torsion pin, to bias the swing arm to a retracted position.

Figure 2A:
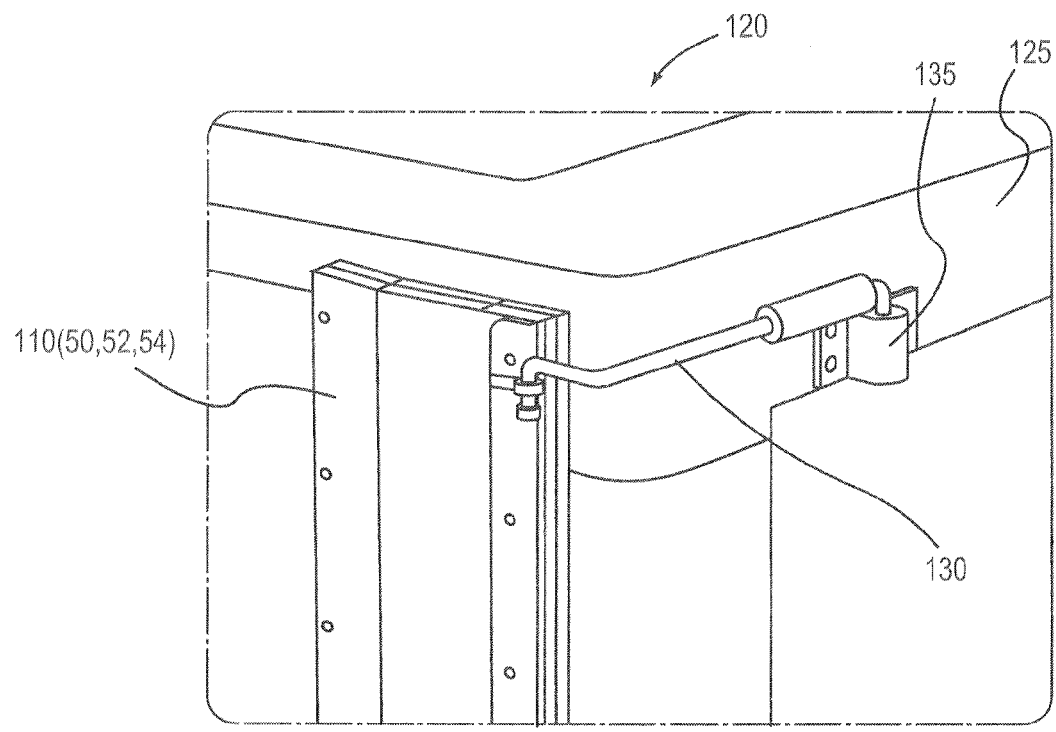
FIGS. 2(A)-(B) are perspective views of an apparatus for drag reduction, according to various aspects of the present invention, in both a retracted position and an expanded position.
Figure 2B:
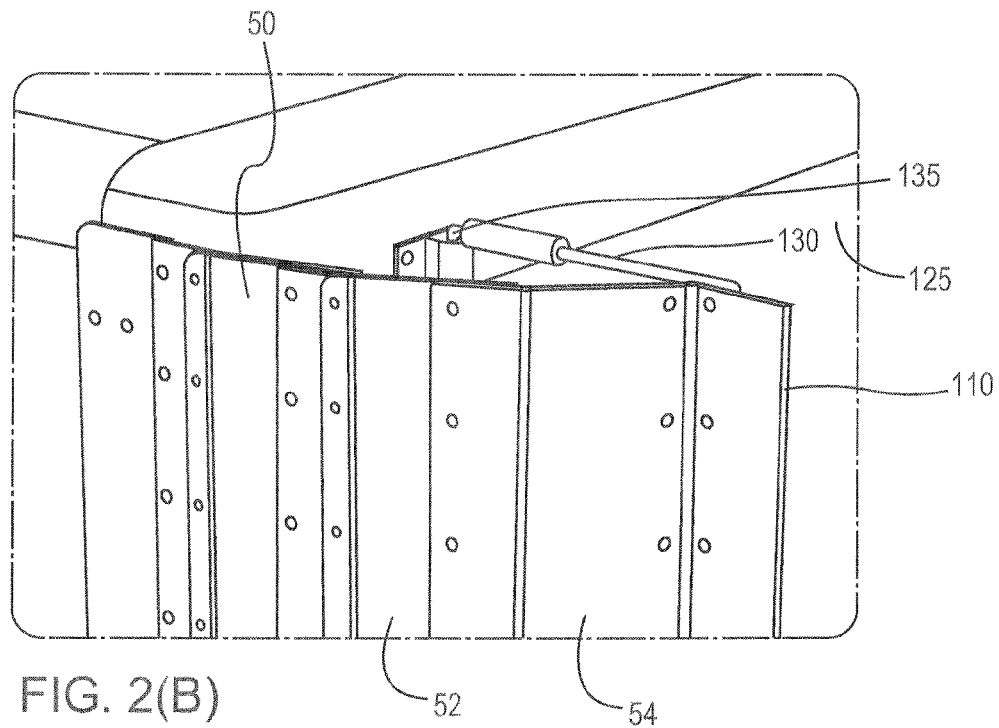

FIGS. 2(A)-(B) show perspective views of an exemplary segmented foil 110, according to various aspects of the present invention, in both a retracted position and an expanded position, respectively. In FIG. 2(A), the swing arm 130 is disposed in a resting position against the back surface 125 of the vehicle 120, in a generally parallel position relative to the surface 125. The segments 50, 52 and 54 of the foil 110 are disposed adjacent each other in this retracted position, adjacent the side of the rear portion of the vehicle 120. It should be noted that, although the foil 110 is described as being retracted on the side of the vehicle 120, other aspects of the invention may include the foil 110 being retracted on the top portion of the vehicle 120. According to one variation in which the foil is located on the top of the vehicle 120, the expanded position of the foil 110 may include the foil expanding downward from the top of the vehicle 120.

In FIG. 2(B), the deployed foil 110 may include segments with a plurality of colors and/or materials, for example. For example, the segments 50, 52 and 54 may not necessarily be manufactured from the same material or have the same overall aspect, such as color, shape, and size. According to various aspects of the invention, one or more of the segments 50, 52 and 54 may include pores, perforations, or other air flow affecting features and/or shape related variations.

Figure 3:
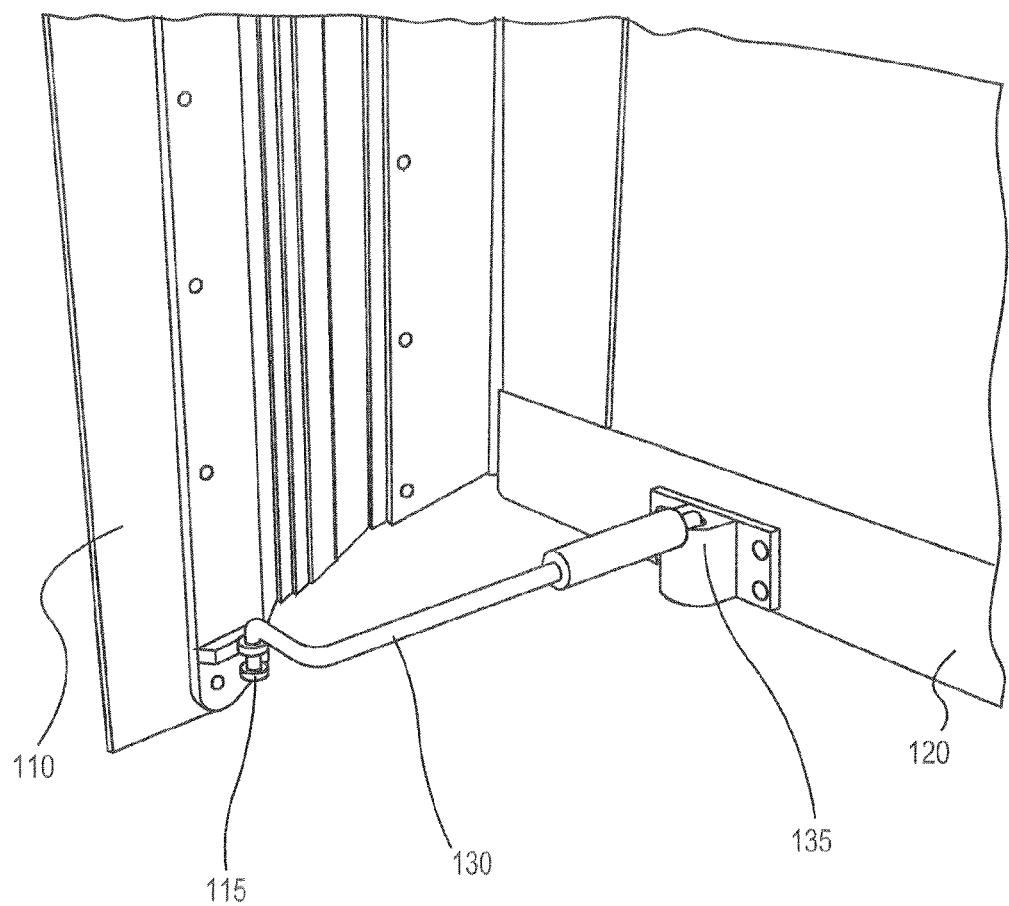
FIG. 3 is a perspective view of a swing arm that moves the drag reducing apparatus between a retracted and an expanded position, according to various aspects of the current invention.

FIG. 3 is a perspective view of the swing arm 130 that moves the segmented foil 110 between a retracted position and an expanded position, according to various aspects of the current invention. It should be noted that, although the swing arm 130 is illustrated as being located at the bottom of the back portion of the vehicle 120 in FIG. 3, the swing arm 130 may be located at any other suitable location on the surface 125 of the vehicle 120, including on top of the vehicle 120 when the foil 110 is located on the top back portion of the vehicle 120. The attachment portion 135, which can also serve as a stop when extended, may maintain the swing arm 130 approximately in an optimal position, which may be somewhat angled or curved relative to the surface 125 of the back of the vehicle so as to generally follow the fluid flow of air past the rear of the vehicle in the exemplary aspect illustrated in FIG. 3. According to various aspects, the portion 135 may also include a biasing element, such as a spring or a torsion pin, incorporated so as to bias the swing arm 130 to a retracted position.

FIG. 4 is a perspective view of an exemplary segmented foil 110 during deployment, in a semi-deployed position between the retracted position and the expanded position, according to various aspects of the current invention. In the exemplary variation, illustrated in FIG. 4, the segmented foil 110 includes three segments 50, 52 and 54 that extend from the top of the vehicle. It should be noted that although the three segments 50, 52, 54 are illustrated in FIG. 4, the foil 110 may have more or less than three segments. In a retracted position, similar to the position illustrated in FIG. 1(A) above, the segments 50, 52 and 54 may be adjacent (e.g., stacked atop each other), generally above of the fixed portion 105. In the foil 110, segment 50 may be attached to the fixed portion 105, segment 52 may be attached to segment 50, and segment 54 may be attached to segment 52. It should be noted that segment 50 may also be attached to the top of the vehicle via hinges similar to hinges 80. According to various exemplary aspects of the current invention, as illustrated in FIG. 4, segment 50 may be connected to segment 52 via a first hinge or other pivoting or sliding feature 56, so as to allow relative positioning (interchangeably referred to herein as a "hinge" portion). The hinge 56 may extend between a pivot point 58, located on or near a portion of the segment 50, and a pivot 60, fixed on or near the front of the next segment 52, for example. In one variation, the hinge portion 56 may include a flat body portion linking segments 50 and 52 at the respective pivot points 58 and 60. It should be noted that the first hinge portion 56 may, for example, be located at about the midpoint of the segment 50, as shown in FIG. 4.

According to various exemplary aspects of the current invention illustrated in FIG. 4, segment 50 may also be connected to segment 52 via a second hinge portion 62. The second hinge portion 62 may extend between a pivot point 64, located on or near a portion of segment 50, and a pivot point 66, located on or near a portion of segment 52. It should be noted that the pivot point 66 may be located at about a midpoint of the segment 52, and the pivot point 64 may be located at a rear portion of segment 50. In one variation, the hinge portion 62 may include a flat portion linking segments 50 and 52 at the respective pivot points 64 and 66. As a result, during deployment of the foil 110, as the segments 50 and 52 expand, the hinge portions 56 and 62 also pivotally deploy to form a quadrangularly cross-sectionally shaped volume delimited by both hinge portions 56 and 62 along two opposite sides, and segment 50 and segment 52 along two opposing sides.

According to various exemplary aspects of the current invention, segment 52 may be connected to segment 54 via a third hinge portion 68. The hinge portion 68 may extend between a pivot point 70, located on or near a portion of the segment 52, and a pivot point 72, located on or near a portion of segment 54. It should be noted that pivot point 70 may be located at about a midpoint portion of the segment 52, and pivot point 72 may be fixed on or near a front portion of segment 54, for example. In one variation, the hinge portion 68 may include a flat portion linking both segments 52 and 54 at the respective pivot points 70 and 72. It should be note that the third hinge portion 68 may be located at about a midpoint of segment 52.

According to various exemplary aspects of the current invention, segment 52 may also be connected to segment 54 via a fourth hinge portion 74. The fourth hinge portion 74 may extend between a pivot point 76, located on or near a portion of the segment 52, and a pivot point 78, fixed on or near a portion of segment 54. It should be noted that the pivot point 78 may be located at about a midpoint of segment 54, and pivot point 76 may be located at a rear portion of segment 52, for example. In one variation, the hinge portion 74 may include a flat portion linking both segments 52 and 54 at the respective pivot points 76 and 78. As a result, during deployment of the foil 110, as the segments 52 and 54 expand, the hinge portions 68 and 74 also deploy and form a quadrangularly cross-sectionally shaped volume delimited by the hinge portions 68 and 74 at opposing sides, and segment 52 and segment 54 at opposite sides.

According to various exemplary aspects of the current invention, segment 50 may be connected to the fixed portion 105 of the segmented foil 110 via hinge portion 80, the hinge portions 80 extending from a pivot point 82 located on or near the segment 50 to fixed portions 105 located on a surface of the vehicle. As discussed above, it should be noted that segment 50 may also be attached to the top of the vehicle via hinges similar to hinges 80. Alternatively, the hinges 80 may also be attached to a leading edge 84 of the segment 50 instead of a middle portion of the segment 50 as illustrated is FIG. 4. For example, a pair of hinge portions 80 may connect the segment 50 at the pivot point 82 to the fixed portions 105. The fixed portion 105 may be located at a rear portion of the vehicle, for example. According to various aspects, the pivot 82 may be located at about a midpoint of the segment 50, and may be located on or near the opposite surface of the segment 50 to which the hinge portions 56 is fixed. It should be noted that some or all of the pivot points 58, 60, 64, 66, 70, 72, 76, 78 and 82 may include biasing features, such as spring tensioning or other suitable urging mechanisms or features. As a result, each of the segments 50, 52 and 54 may be biased to a retracted position. According to various aspects of the current invention, the segments 50, 52, 54 may be variably biased so that, for example, segment 50 may have a stronger bias to the retracted position than segment 52, and segment 52 may have a stronger bias to the retracted position than segment 54. Thus for example, outer extended portion segments may have weaker biases to the retracted position than inner segments. As a result, the outer segments deploy more easily to the expanded position during movement of the vehicle, and the segments less and less easily in a sequential manner as they are located closer to the fixed portion 105.

According to various aspects of the current invention, as shown in FIGS. 1-4, when the vehicle 120 is in motion and the foil 110 deploys to its fully expanded and/or optimal position, one or more of the segments 50, 52 and 54 may be deployed in a position that is somewhat angled or curved in an inward curve relative to a side of the vehicle 120, so as to follow generally the fluid flow of air past the rear of the vehicle when the foil 110 is positioned to the side of the vehicle 120, or on the top of the vehicle 120. Contemporaneously, at least a portion of one or more of the segments that are further extended from the vehicle 120, such as segment 54, may be oriented in a position that is substantially perpendicular to the back surface of the vehicle, such as the surface 125 illustrated in FIG. 1(B).

According to various aspects, because of the retracted position of the foil 110 and the manner in which the segments 50, 52 and 54 are stacked over each other, during expansion of the foil 110 when the vehicle 120 is moving, the pivot portions 56, 62, 68 and 74 may rotate approximately 180° from their original retracted position to their final expanded position. During deployment of the foil 110, the segments 50, 52 and 54 are connected to one another in a way that forms generally quadrilaterally cross-sectionally shaped volumes, as shown in the perspective view of FIG. 4 and discussed above (the segments and hinge portions together interchangeably referred to herein as "four-bar" systems).

According to various exemplary aspects of the current invention, in an air velocity deployment mode, when the vehicle 120 reaches a predetermined driving speed, airflow may begin to lift (e.g., as an air foil) the segments 50, 52 and 54 of the segmented foil 110 away from the fixed portion 105. As this lift occurs, the segments 50, 52 and 54 deploy, and pivot portions 56, 62, 68 and 74 may rotate relative to the attached sides or top of the vehicle 120, and stabilize in an optimal or otherwise advantageous drag-reducing position. In that position, the shape of the deployed segmented foil 110 directs air flow to the rear of vehicle 120 in a manner that achieves drag reduction.

According to various exemplary aspects of the current invention, a swing arm 130 may be provided to stabilize the segmented foil 110 in an approximately optimal or otherwise advantageous position, such position being the position that allows maximum or increased drag reduction. According to various aspects, this position may be a position where the swing arm 130 is approximately perpendicular to the surface 125 of the back portion of the vehicle 120. In order to help stabilize the swing arm 130 into such advantageous position, the attachment point 135 may be located at the juncture between the swing arm 130 and the back of the vehicle 120 and may act as a stop, as explained above and shown in more detail in FIG. 3.

According to various exemplary aspects of the current invention, after deployment of the foil 110, once the speed of the vehicle decreases below a predetermined speed, the foil 110 may retract automatically under the force of biasing elements in the pivots and among the segments, segments as discussed above. In some variations, if the swing arm 130 is lockable in the optimal position, then the swing arm 130 may be subsequently unlocked by an operator so as to allow the foil 110 to return to the retracted position. The attachment point 135 may also include a stop feature configured to unlock the foil 110 under a shock, such as when the vehicle 120 contacts a wall, another vehicle or another structure. Operation and features of the stop are explained in more detailed below. It should also be noted that the foil 110 may be configured to be deployed and retracted via mechanical or other manual control regardless of the speed of the vehicle.

Figure 5A:
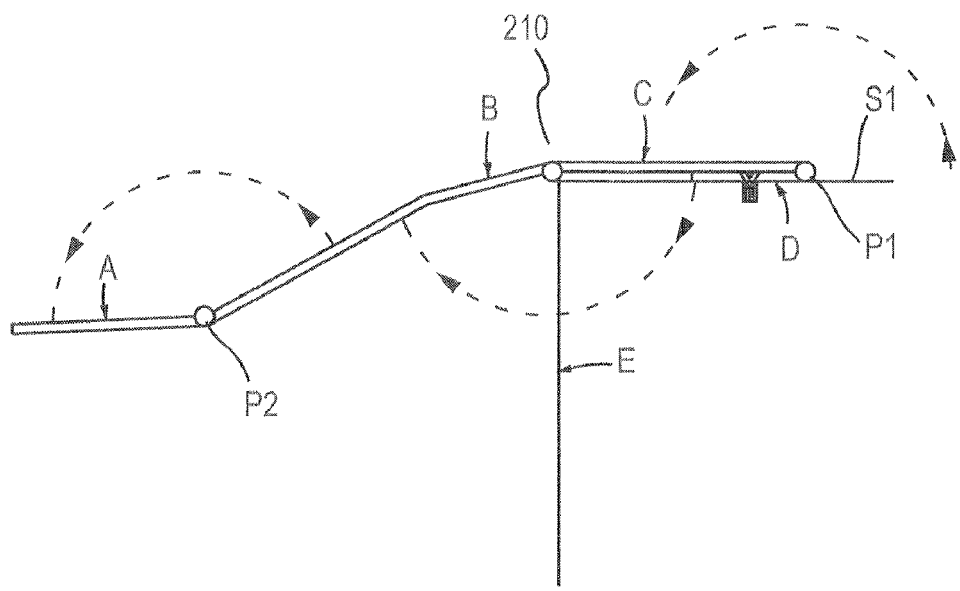
FIGS. 5(A)-(B) show representative views of another exemplary drag reducing apparatus, according to various aspects of the present invention, in both a retracted position and an expanded position.
Figure 5B:
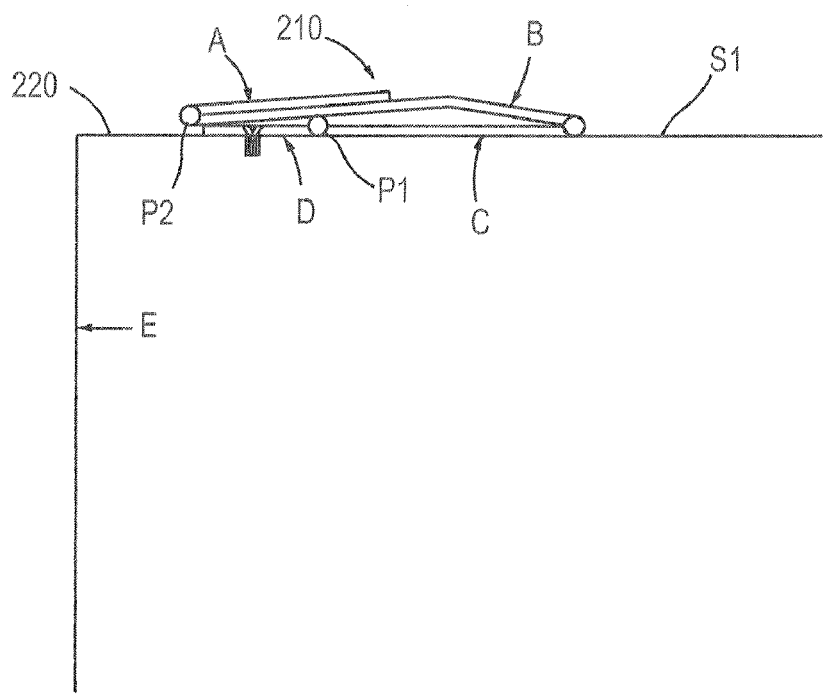

FIGS. 5(A)-(B) show representative side views of another variation of an exemplary drag reducing apparatus or foil 210, according to various aspects of the present invention, in both a retracted position (FIG. 15A) and an expanded position (FIG. 15B). In FIG. 5(B), the foil 210 is fixed to either the top, or a side of the vehicle 220. In FIG. 5(B), since the foil 210 is in the retracted position, each one of the segments A, B, C and D are collapsed so as to be adjacent one another. Upon deployment into the expanded position, as shown in FIG. 5A whether via mechanical operation or automatically as a traction of movement of the vehicle, each one of the segments A, B and C rotate from their respective retracted positions to their expanded positions, while segment D remains fixed to the surface of the vehicle 220. For example, segment D remains attached to the side or to the top of the vehicle 220, while segment C rotates 180° about pivot location $P_1$, as illustrated in FIGS. 5(A)-(B). During the rotation of segment C, segment B remains quasi-parallel to the surface of the vehicle 220 during rotation of segment C. When segment C rotates more completely, as illustrated in FIG. 5(A), segment B eventually extends behind the rear side E of the vehicle 220. It should be noted that, regardless of whether the foil 210 is located on the side of the vehicle or on top of the vehicle, the segment B may extend past the rear side E. During the rotation of segment C and the motion of segment B during extension, segment A may rotate up to about 180° about pivot location $P_2$ upon the foil 210 being fully expanded. Thus, when the foil 210 is fully extended, segment D remains attached to the surface of the vehicle 220, segment C has rotated about 180° so as to reach a position approximately parallel to side or to the top of the vehicle 220, segment B has moved while remaining quasi parallel to the side or to the top of the vehicle 220 before extending inwards toward the rear surface E of the vehicle 220 relative to the side/top, and segment A has rotated about 180°. According to various aspects of the current invention, segments B and D may form an angled- curved- like cross-sectional shape, so as to generally follow the fluid flow of air past the rear of the vehicle 220, with such a shape and position corresponding to an enhanced drag-reducing position.

According to various exemplary aspects of the current invention, in an air velocity deployment mode, when the moving vehicle reaches a predetermined driving speed, airflow may begin to lift the segments A, B and C away from the fixed segment D. As this occurs, the segments A, B and C deploy by rotating relative to each other, as illustrated in FIG. 5(A), and stabilize in an optimal or otherwise advantageous drag-reducing position. In the extended position, the shape of the deployed segments directs air flow to the rear of the moving vehicle in a manner that achieves drag reduction. According to various exemplary aspects of the current invention, similar to as shown in FIGS. 1-3, a swing arm may be provided to stabilize the deployed segments A, B, C in the deployed position so as to increase drag reduction.

According to various exemplary aspects of the current invention, when the speed of the vehicle decreases to below a predetermined speed, the segments A, B and C may retract automatically under the action of biasing features in, for example, pivots P1 and/or P2, which may include torsion pins or biased hinge pins. The pivots P1 and/or P2 may be biased to a retracted position via the torsion pins, for example, as illustrated and described more clearly with respect to FIGS. 9(A)-(B) below. It should also be noted that the segments A, B and C may be deployed and retracted via mechanical or other manual control, regardless of the speed of the vehicle.

FIG. 6A shows a perspective view of another exemplary drag reducing apparatus 310, according to various aspects of the present invention. In FIG. 6A, the apparatus 310 includes air diverters 330 that are disposed along the top surface of the vehicle 320. It should be noted that the air diverters 330 can also be disposed along one or both sides of the vehicle 320, together with, or alternatively to, being located on top 320 of the vehicle. The air diverters 330 may be disposed in an angled orientation, as shown, and may be disposed substantially along the entire length of the top of the vehicle. The air diverters 330 may also be separated from one another by equal spacing, or by unequal spacing. A side view of an air diverter 330, as illustrated in FIG. 6B, reveals that an exemplary such diverter 330 has a thickness and may be fixed to the top of the vehicle 320, or to the side of the vehicle 320, via any adhesive substance, adhesive system, or other temporary or permanent affixing material or device such as, an adhesive tape, glue, or the like. Although FIG. 6A shows the air diverters 330 as having an angled overall shape, the diverters 330 may have other shapes, such as a stair-step, a straight line, a curved pair, or the like. Because of the shape, size and location of the air diverters 330, any drag that occurs as a result of the movement of the vehicle 320 may be reduced by producing turbulent breaks in the airflow. In addition, although FIG. 6B shows an aspect of the diverter 330 that has an elongated shape with a shaped upper surface, the diverter 330 may have a differently shaped upper surface, such as a flat surface, a rough surface, a stepped surface, a ridged surface, and the like. It should be noted that the air diverters 300 may be used in conjunction with the diverters illustrated in FIGS. 1, 4 and 5, so that the air flow being directed by the air diverters 300 and towards the side can then be further directed by the diverters as illustrated in any of FIGS. 1, 4 and 5.

Figure 7:
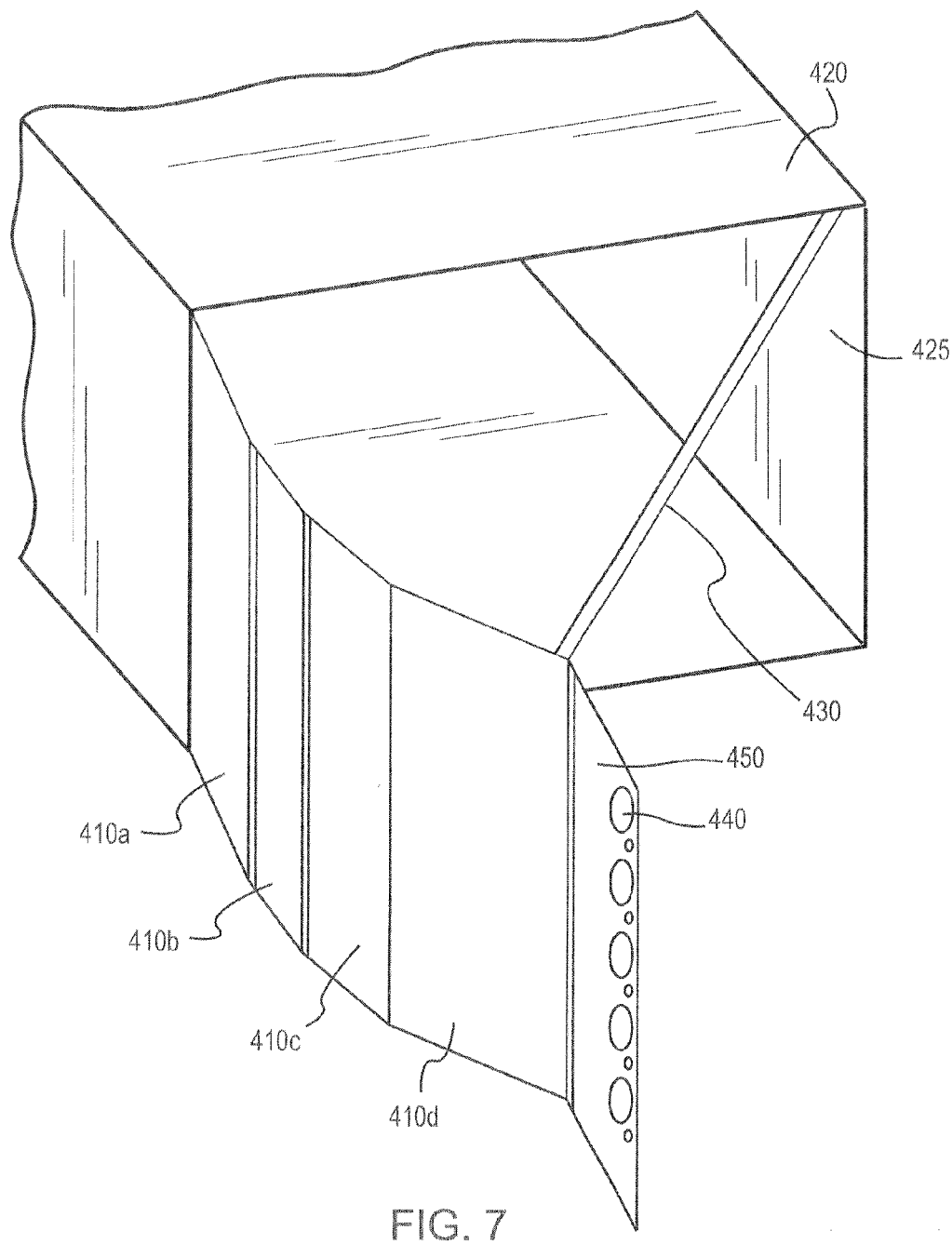
FIG. 7 is a perspective view of another exemplary drag reducing apparatus, according to various aspects of the present invention.

FIG. 7 is a perspective view of representative portions of another exemplary drag reducing device, according to various aspects of the present invention. In FIG. 7, the drag reducing foil 410 is illustrated during its full deployment, attached to either the top of the vehicle or the side of the vehicle 420. In FIG. 7, the foils 410a, 410b, 410c, 410d are shown in an extended position and have a flap 450 attached to the outermost foil 410d. The outermost foil 410d is also attached to a back edge 425 of the truck via the swing arm 430. According to various exemplary aspects, the flap 450 includes one or more perforations 440 of varying sizes. The perforations 440 may increase the performance of the foil 410 by reducing the drag created during motion of the vehicle 420.

FIGS. 8(A)-(B) show views of certain features of an exemplary swing arm 130 usable with various drag reducing apparatuses, according to aspects of the present invention. In FIG. 8(A), the swing arm 130 includes a portion 138 that may attach to an air diverter, and a portion 135 that may be used to secure the swing arm 130 to a bracket 140 of the vehicle. The portion 138 together with the attachment portion may also operate as a stop when the foil to which the swing arm 130 is attached is expanded in its optimal drag reducing position. The portion 135 may have a biasing device, such as a spring coil therewith, used to bias the swing arm 130 towards a collapsed position, such as against the side or top surface of the vehicle in the retracted position of the drag reducing foil. A collapsed position of the swing arm 130 may be a position where the swing arm is inserted in the notch 142 of the bracket 140. When the swing arm 130 is inserted in the notch 142, the biasing device 137, such as a spring, applies a biasing pressure to maintain the swing arm 130 in the notch 142, thereby locking the swing arm in a fully retracted position. It should be noted that, according to various aspects of the current invention, the swing arm 130 may alternatively be biased towards a position corresponding to a full expansion of the drag reducing device, which may be a position somewhat angled or curved relative to perpendicular to the surface of the back of the vehicle, so as to follow generally the fluid flow of air past the rear of the vehicle. Such a full extension position may correspond to the swing arm 130 being inserted into the notch 144 of the bracket 140. In this position, the biasing device 137 also applied pressure on the swing arm to remain in the notch 144, thereby locking the swing arm in a fully extended position. It should be noted that an angle between the positions of the notches 142 and 144 may be lower than 90°. Alternatively, the angle between the notches 142 and 144 may be about 90°. According to various aspects of the current invention, along the longest portion of the exemplary swing arm 130 shown in FIG. 8(A), a slide arm 132 is disposed, and the slide arm 132 is configured to slide inside a housing 134. The housing 134 may include a biasing reduction 136, such as a spring, to bias the slide arm 132 as it slides inside the housing 134 (e.g., biased to a contracted portion such as to aid in overall biasing of the foil in the collapsed position).

According to various aspects of the exemplary swing arm 130 of FIG. 8(A), on an end of the housing 134 that is further from the securing portion 135, a variably extendable cap 133 may be disposed, to allow for the adjustment of the length of the long portion of the swing arm 130. Accordingly, the length of the swing arm 130 may be adjusted to allow attachment of the drag reducing device when the device is in deployment to reduce drag. The cap 133 may, for example, be threadably engaged with corresponding threads of the housing 134, so as to allow travel of the cap 133 to longer or overall shorter lengths in conjunction with the housing 134. On an end of the slide arm 132 that is opposite the securing portion 135, the swing arm 130 may be attached to a drag reducing foil, for example. Accordingly, the drag reducing foil can be urged by the swing arm 130 to deploy, to retract, or be maintained at an optimal drag-reducing position. At an opposite side to the side attached to the attachment portion 135, the swing arm 130 may attach to a segment of a drag-reducing foil via attachment portion 137. FIG. 8(B) illustrates an exemplary security portion 135 for the swing arm 130, according to various aspects of the current invention.

Although FIG. 8(A) illustrates a swing arm having a rigid elbow 139, the elbow 139 may include a pivot point that allows the swing arm to collapse or expand slightly a the pivot point 139 and thus rotate about the attachment portion 135, as indicated by the arrows on FIG. 8(A). It should also be noted that this rotation feature of the elbow 139 may be part of a swing arm that does not include a slide portion 134 and an urging portion 136. In other words, the swing arm may have a long side that is rigid, similarly to the swing arm 130 illustrated in FIG. 3, and a pivot point 139 that allows the swing arm to rotate about the attachment portion 135 in order to accommodate any movement of the air diverters between a retracted position and an extended position.

Figure 9A:
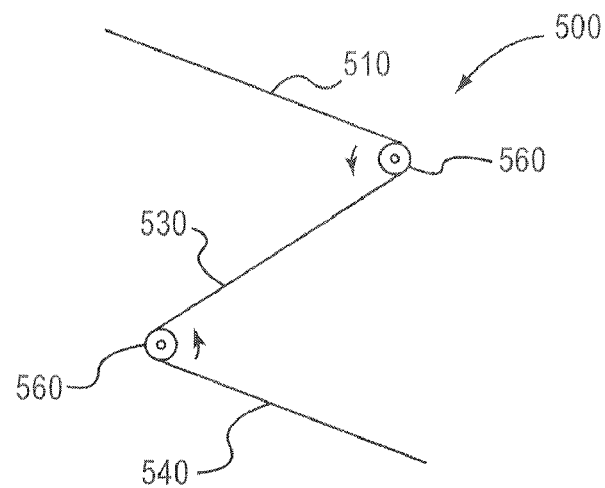
FIGS. 9(A)-(B) are illustrations of torsion hinge-pins attaching air diverters according to various aspects of the present invention.
Figure 9B:
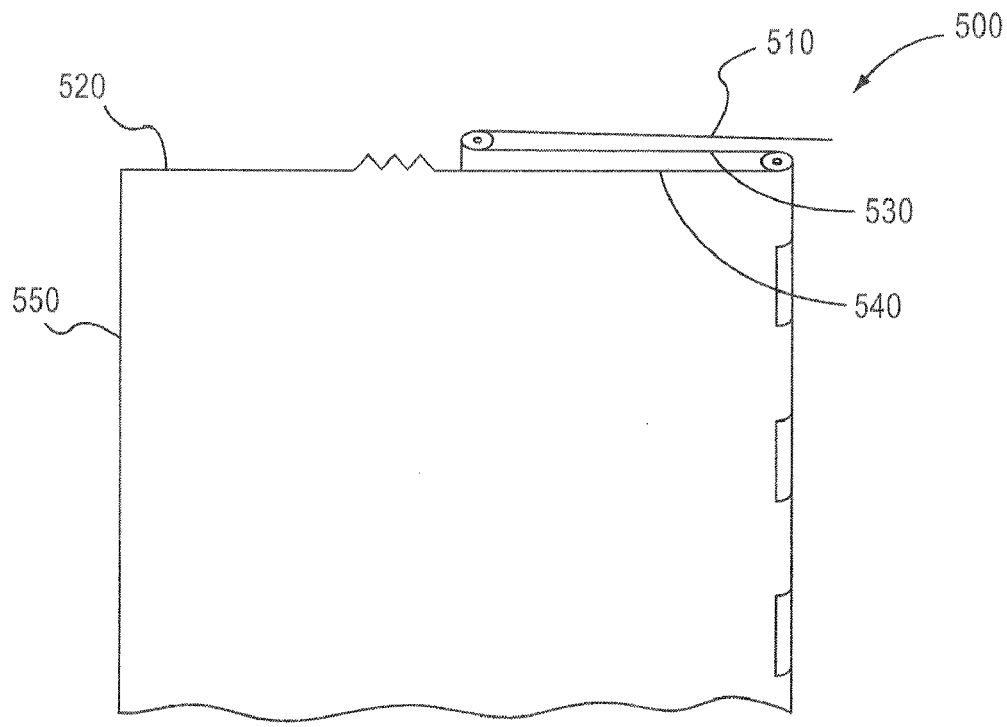

FIGS. 9(A)-(B) contain representative illustrations of various features of exemplary torsion hinge-pin attaching air diverters, according to various aspects of the present invention. In FIG. 9B, the air diverter or foil 500 is fixed to the top (or side) 520, (or 550) of a vehicle. FIG. 9(A) illustrates several segments 510, 530 and 540 of the foil 500 attached to one another via hinge-pins or torsion pins 560. According to various aspects of the current invention, the hinge-pins or torsion pins 560 are biased so as to bias the foil 500 to a retracted position, where the segments 510, 530 and 540 are urged to collapse in a configuration where the segments 510, 530, 540 are substantially parallel to one another, as the biasing force generally indicated by the direction of the arrows on FIG. 9(A). In FIG. 9(B), the segments 510, 530 and 540 are shown in the retracted position, collapsed in a configuration where the segments are substantially parallel to one another. Upon deployment into the expanded position, whether via mechanical features or during movement of the vehicle, for example, each of the segments 510 and 530 move from their respective retracted positions to their expanded positions against the biasing direction of the hinge-pins 560, while segment 540 remains fixed to the surface of the vehicle 520 or 550. According to various aspects, deployment of the segments 510, 530 and 540 is accomplished similarly to as described above with respect to FIGS. 1-5.

While aspects of this invention have been described in conjunction with the exemplary variations outlined above, various alternatives, modifications, variations, improvements, and/or substantial equivalents, thereof whether known or that are or may be presently unforeseen, may become apparent to those having at least ordinary skill in the art. Accordingly, the exemplary aspects of the invention, as set forth above, are intended to be illustrative, not limiting. Various changes may be made without departing from the spirit and scope hereof. Therefore, aspects of the invention are intended to embrace all known or later-developed alternatives, modifications, variations, improvements, and/or substantial equivalents.

What is claimed is:

1. An apparatus for reducing atmospheric drag on a vehicle, the apparatus comprising:
   at least two moveable segments successively coupled to each other and attached to the vehicle, each of the at least two moveable segments having a retracted position and an extended position; and
   a swing arm attaching a first one of the at least two moveable segments with the vehicle;
   wherein at least one of the moveable segments extends behind at least a portion of the back of the vehicle when in the extended position.

2. The apparatus of claim 1, wherein the swing arm attaches the first one of the at least two movable segments to the top of the vehicle.

3. The apparatus of claim 1, wherein at least one of the swing arm and the at least two moveable segments contains a biasing feature to bias the apparatus to the retracted position.

4. The apparatus of claim 3, wherein the biasing feature comprises at least one selected from a group consisting of a spring and a torsion pin.

5. The apparatus of claim 1, wherein the swing arm locks in an approximately perpendicular direction from a back surface of the vehicle when the first one of the at least one moveable segment is in an extended position; and
   wherein the swing arm lies against to the back edge of the vehicle when in a retracted position.

6. The apparatus of claim 1, wherein the swing arm comprises:
   a slide arm;
   a housing in which the slide arm is configured to slide; and
   a slide arm biasing element located so as to bias the slide arm into the housing.

7. The apparatus of claim 6, wherein the swing arm further comprises a cap engageable with the housing so as to adjust a length of the swing arm.

8. The apparatus of claim 7, wherein the cap is threadably engaged with the housing.

9. The apparatus of claim 6, wherein the swing arm biasing element is a spring.

10. The apparatus of claim 1, wherein the swing arm moves to the extended position when the vehicle moves above a predetermined velocity and returns to the retracted position when the vehicle moves below the predetermined velocity.

11. The apparatus of claim 10, wherein the swing arm is lockable in the extended position.

12. The apparatus of claim 1, wherein two successive movable segments are connected to each other via a pivoting feature.

13. The apparatus of claim 1, further comprising:
a first portion provided on a top surface of the vehicle; and
at least a second portion provided on the top surface of the vehicle;
wherein the first portion and the at least second portion are configured to minimize drag on the moving vehicle by diverting air to the at least one movable segment.

14. The apparatus of claim 13, wherein respective heights and widths the first portion and the at least second portion, and a distance separating the first portion and the at least second portion, minimize drag on the moving vehicle.

15. The apparatus of claim 13, wherein
a cross section of the first portion and the at least second portion on the top of the vehicle is at least one of a triangular cross section, a see-saw cross section, a stair-shaped cross section, a bent line, and a straight line; and
at least one of the plurality of air diverters has a rectangular shape.

16. The apparatus of claim 1, further comprising:
at least one flap attached to an outer portion of the at least one movable diverter; and
a plurality of perforations in the at least one flap; wherein the perforations have at least one of a same size and/or shape and different sizes and/or shapes.

17. The apparatus of claim 1, wherein when in the extended position, the at least one of the moveable segments extends below a horizontal plane of a top portion of the vehicle.

18. An apparatus for reducing atmospheric drag on a moving vehicle, comprising:
a plurality of moveable segments attached to the vehicle, each one of the plurality of moveable segments having a retracted position and an extended position; wherein
the movable segments are folded against one another when in the retracted position and fold out away from one another when in the extended position; and
at least one of the plurality of movable segments extends inwardly behind at least a portion of the back of the vehicle when in the extended position.

19. The apparatus of claim 18, further comprising a swing arm attaching one of the plurality of movable segments to the back edge of the vehicle; wherein
the swing arm attaches a first one of the at least one movable segment to at least one of a top of the back edge of the vehicle and a bottom of the back edge of the vehicle;
wherein at least one of the swing arm and each of the at least one movable segment contains a biasing feature to bias the apparatus to the retracted position;
wherein the biasing feature comprises at least one selected from a group consisting of a spring and a torsion pin;
the swing arm locks in an approximately perpendicular direction from a back surface of the vehicle when the first one of the at least one movable segment is in the extended position; and
the swing arm lies against to the back edge of the vehicle when in the retracted position.

20. The apparatus of claim 18, wherein the swing arm comprises:
an urging element at a portion of the swing arm attached to the back edge of the vehicle, the urging element biasing the swing arm to the retracted position;
a slide arm;
a housing in which the slide arm is configured to slide;
a slide arm biasing element located so as to bias the slide arm into the housing; and
a cap engageable with the housing so as to adjust a length of the swing arm; wherein
the urging element is one of a spring and a torsion pin.

21. The apparatus of claim 12, wherein the swing arm moves to the extended position when the vehicles moves above a predetermined velocity and returns to the retracted position when he vehicles moves below the predetermined velocity; and
wherein in order to reach an extended position from a retracted position, one or more of the plurality of movable segments rotate more than 90° from each other.

22. The apparatus of claim 18, wherein when in the extended position, the at least one of the plurality of movable segments extends below a horizontal plane of a top portion of the vehicle.

* * * * *